United States Patent [19]
Crompton

[11] 4,389,927
[45] Jun. 28, 1983

[54] METHOD AND APPARATUS FOR SEPARATING APRICOT KERNELS FROM HUSKS

[75] Inventor: Alan W. Crompton, 13 The Crescent, Marryatville, South Australia, Australia

[73] Assignee: Alan Woodhouse Crompton, Marryatville, Australia

[21] Appl. No.: 262,291

[22] Filed: May 11, 1981

[51] Int. Cl.³ .............................................. A23N 5/00
[52] U.S. Cl. ...................................... 99/575; 99/628; 209/673
[58] Field of Search ............... 209/673, 670, 669, 668, 209/667; 99/569, 575, 629, 628

[56] References Cited
U.S. PATENT DOCUMENTS

| | | | |
|---|---|---|---|
| 1,157,199 | 10/1915 | Williams | 209/670 X |
| 1,594,702 | 8/1926 | Williams | 99/569 X |
| 2,319,757 | 5/1943 | Vigneau | 209/673 X |
| 2,519,643 | 8/1950 | Garrigue | 99/569 X |

Primary Examiner—Allen N. Knowles
Attorney, Agent, or Firm—Harlan P. Huebner

[57] ABSTRACT

In the separation of kernels from the shells of apricot stones the steps of placing at least the medially opened kernels not separated from the shells onto two moving surfaces with the separating gap below the shells, the moving surfaces each moving in an upward direction from the separation gap, and being arranged to carry the said medially separated shells along said separation gap from an input location to an output location.

3 Claims, 4 Drawing Figures

METHOD AND APPARATUS FOR SEPARATING APRICOT KERNELS FROM HUSKS

BACKGROUND OF THE INVENTION

At the present time there is a problem relating to the separation of the resultant products of breaking open apricot stones.

That is to say, it is presently well known, in order to recover apricot stones, to break the shell or husk around the kernel the present method then of separating the husk from the kernel is to use aerodynamic of air separation.

Unfortunately, perhaps because of the shape of the resultant husk resulting from the necessary fracturing technique or because of the shape of the husk as compared to its weight, the separation is not fully effective, and it is then necessary to ensure that no kernels or only a minimal number of kernels are lost because of ineffective separation.

This is at the present time, achieved by hand, that is the resultant product of the aerodynamic separation is then spread out onto a moving belt and one, two or more people observe the result by hand and manually pick out any kernels remaining in the mixture.

The husks of course are then discarded.

Perhaps it goes without saying that the present manual method of separation is both expensive and somewhat arduous and it would certainly be prefered if there was some way in which the separation could be effected in another way, but hitherto that this has not been considered to be economically possible.

SUMMARY OF THE INVENTION

This invention proposes in the method of separation of kernels from the shells of apricot stones the steps of placing at least the medially opened kernels not separated from the shells onto two moving surfaces with a separation gap below the kernels, the moving surfaces each moving in an upward and outward direction from the separation gap, and being arranged to carry the said medially separated shells along said separation gap from an input location to an outlet location.

Preferably one of the moving surfaces has a portion of the surface shaped differently from the corresponding surface on the other side so as to cause a tipping effect on the kernel.

This tipping effect can have the result of rapidly twisting the shell and it is found that with the random contact of the shell and kernel on different portions of the moving surface this will have the result of throwing the kernel out from the medially separated shell and of course by reason of the separating gap the kernel will therefore fall below the surfaces while the shell will be carried to the outlet location.

It is perhaps not necessary to state as it is implicit in the need for the apparatus to perform the task but for the sake of clarity it will be pointed out that the separating gap between the moving surfaces is set so that it will differentially allow kernels of apricot stones to pass therebetween while not allowing medially broken husks or shells which are therefore by reason of the angle of the moving surfaces and the fact that both surfaces are moving approximately at the same rate will be carried to an outlet location.

Preferably the moving surfaces are provided by these being the outer surfaces of two rollers which are held in generally parallel alignment one with respect to the other and these are constrained to rotate about their axes in a contra direction each of the rollers being of a similar diameter and being substantially of constant cross-section with a smooth outer surface for substantially their length so as to provide the effect stated.

Preferably there is the portion of the surface of one of the cylinders which differs from the corresponding surface of the other cylinder in the preferred instance by reason of this being a line of weld in metal surface of spiral shape for part way along the length of the roller.

In another form the invention can be said to reside in the separation of kernels from shells of apricot stones the steps of placing at least the medially opened shells not separated from the kernels at an input location onto the rotating circumferences of two rollers, arranged in side-by-side relationship and, throughout an operating length, each being of substantially constant cross-section and of substantially common diameter providing thereby two rising and separating surfaces above a separation gap of a width allowing kernels to pass therethrough but not radially fractured shells and effecting transfer of the shells from an input location to an output location, the rollers each having their axes at an inclined angle to the horizontal such that the shells will move along the rollers from the input location to the output location upon the said rotation of the rollers.

The reason the process works is because of a quite peculiar characteristic of the apricot shell and esepcially when this is broken, the shape of the resulting shell.

For some reason, perhaps because of the inherent characteristic of the stone, the apricot stone will fracture when broken according to well-known techniques of a fracturing such stones, along a median line so that half of the shell is still whole.

The remaining half of the shell then will have a thickness across the minimum width which nonetheless is greater than the median thickness of the kernel and therefore if both the kernel and the thus broken shell are fed onto the two contra rotating rollers, the distance apart on the rollers can be set so that as the members align themselves to roll upon their minor axis which is a characteristic of the separation technique, then it will be apparent that the shell can be held from passing through the gap and the kernel can be allowed to pass through the gap.

Aerodynamic separation of a fractured apricot shell will remove most of the smaller broken matter so that in fact those parts of the shell that remain are in fact either the kernel or the husks which have been broken medially and hence the significant value of the separation technique.

There has been found one characteristic in the separation in that because the medially fractured husk or shell can also hold therein the kernel, then the shell can in fact hold the kernel from falling through the separating gap.

This can however be overcome by providing some variation along its length of the separating or lifting effect of one portion of the roller as compared to the other, and in the simplest case this is provided by simply providing a slightly raised ridge along a small portion of the surface of one roller.

This has the effect of lifting and tipping all of the shells as they pass this location and simply by tipping or tossing these shells with the joint tipping action, ensures that at least most of the kernels if not all of the kernels are eventually separated and allowed to pass through the separating gap.

While the apparatus can be effective with the rollers parallel one to the other, there is some value in providing that the rollers are set so that their axes are at a slight angle one with respect to the other and this has the effect of providing a slightly open gap between the rollers from one end as compared to the other.

The result of this then is to provide a spreading of the materials passing between the rollers and this is of value where such materials are dropped onto a moving belt from whence a manual inspection occurs.

It is to be emphasized that this is a preferable feature of having the rollers slightly askew and indeed in adjusting the rollers, there is some value in providing one end with a fixed distance apart and then varying the other so as to optimize the distance apart for the particular husks and kernels being separated.

For the invention to be better understood it will now be described with the assistance of drawings in which:

DETAILED DESCRIPTION OF THE PREFERRED EMBODIMENT

Referring in detail to the drawings now the apparatus includes two rollers 1 and 2 which are each preferably of common diameter and arranged so that along their length they are separated by a distance apart sufficient to leave a separating gap shown at 3.

Figure 1:
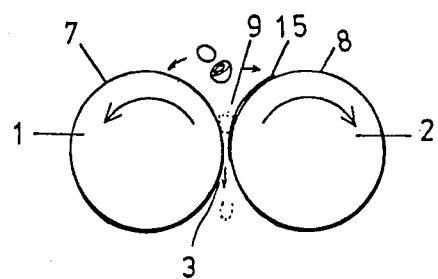
FIG. 1 shows in a schematic way an arrangement of two rollers and the way in which the shell with kernel will be tipped.
Figure 4:
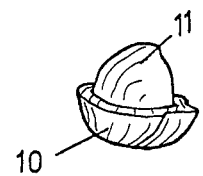
FIG. 4 is a perspective view of a medially fractured apricot stone showing the half of the shell as it would normally be expected to be fractured and the kernel sitting within this.
Figure 2:
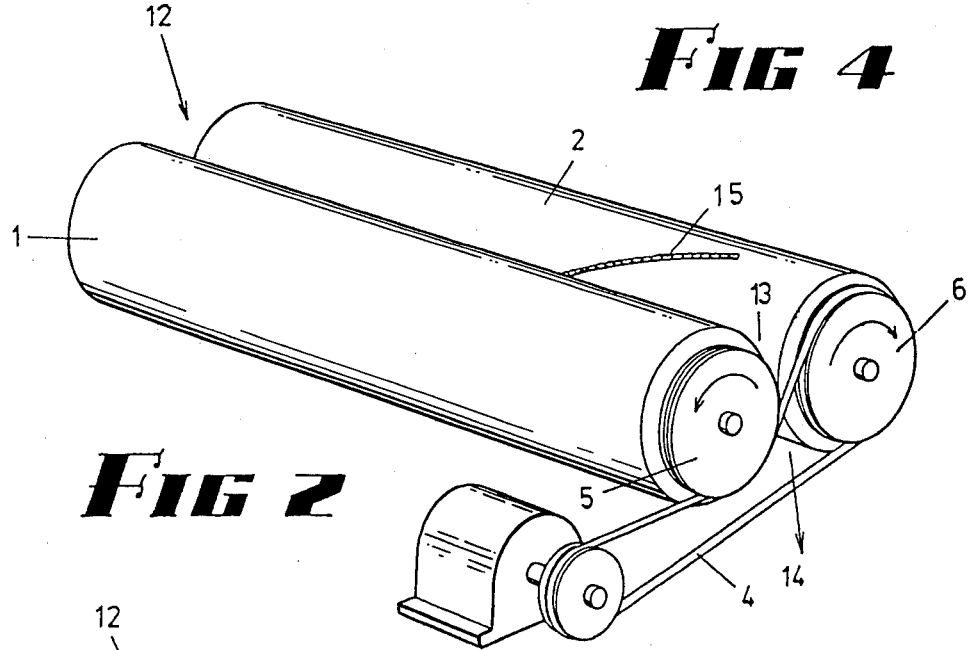
FIG. 2 shows in perspective view a preferred arrangement of apparatus including the two rollers and showing the input location and the output location.
Figure 3:
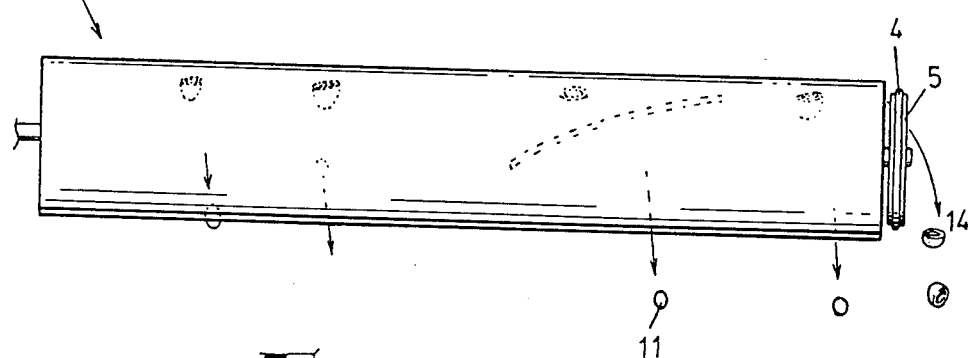
FIG. 3 is side view of the arrangement as shown in FIG. 2 showing however typically the expected arrangement of apricot shells and kernels being separated therefrom.

Each of the rollers is constrained to rotate by reason of a common belt 4 coupling with each of the pulleys 5 and 6 so that these are both rotating in contra direction one with respect to the other and causing the surfaces 7 and 8 to constantly rise and move apart at the location shown at 9 into which apricot stones which have medially fractured shells with kernels still therein such as is shown at FIG. 4 with the shells at 10 and the kernel at 11 can be located at an input location shown by arrow 12.

The input location 12 is such that the rollers provide support for the shells 10 which is higher than the support at the end 13 so that by reason of the constant rotation of the rollers 1 and 2 and by reason of the slight inclination of the rollers to the horizontal which inclination is to such an extent as can be found in practice to work to best advantage the shells will slowly move from the input location 12 through to the output location 14.

While it is not shown specifically, there are means supporting the rollers 1 and 2 such that separation gap 3 can be varied even if slightly along the length of the rollers so that at the start or input location 12 it will be slightly narrower than at the outlet location 14.

This has the effect of spreading the kernels over any belt that might be passing below the rollers.

Some of the kernels 11 are more difficult to dislodge from the shell as is shown in 10 and for this reason there is a line of weld 15 located so as to extend partially along one of the surfaces of a roller 2.

This thereby provides a protrudence of a part of the surface of the roller which is not matched by any equal protrudence on the other roller 1.

With this arrangement, as any shell reaches this location it will have a different effect caused by the lifting from the side by one roller without a similar lifting by the other so there will be at the same time a tipping and lifting effect.

The speed or rotation of the rollers and indeed the diameter of the rollers can vary considerably providing a high degree of selectively for best operation.

The method is then in the separation of a kernel 11 from a nut 10 is to follow the steps of placing the medially opened shell 10 at the input location 12 so that it rests between the two rollers 1 and 2 and then by reason of rotation of the said rollers and by reason of the inclination of the axes of the rollers with respect to the horizontal there is caused a movement of the shell 10 along from the input location 12 to the output location 14.

If the kernel 11 has not been separated in the first part of the apparatus, the two rollers which are arranged in side-by-side relationship and, throughout their operating length, each being of substantially equal cross-section and providing thereby to rising and separating surfaces 8 and 7 above a separation gap 3, one of the rollers 2 having the protruding weld 15 adapted to effect the tipping of the shells that passes this area.

This then describes the preferred embodiment from which it will be seen that it is now a very good answer to automatically obtaining separation of kernels from shells in relation to apricot stones which has hitherto been necessarily performed by hand.

While the preferred embodiment of the invention has been described herein, it will be understood that the same is susceptible of modification in many particulars and that the invention is not to be taken as limited to the embodiment illustrated and described.

I claim:

1. Apparatus for finally separating kernels from partial shells of apricot stones wherein said apricot stones have been previously processed to medially fracture each of said shells creating a partial shell with said kernel therein, said apparatus including:

a pair of rollers for separating said kernel from said partial shell each spaced one from the other and supported for rotation and each having an outer surface and an input end and output end, and said rollers inclined with said input end elevated above said output end;

motive means connected to said rollers for clockwise rotation of one of said pair of rollers and counter-clockwise rotation of the other of said pair of rollers whereby said medially fractured shell will be tumbled causing the release of some of said kernels therefrom and pass said shells downward to be discharged from said outlet end;

means associated with said pair of rollers to adjust the space between rollers whereby only said kernels may pass between said rollers; and kernel dislodgment means projecting from at least one of said rollers of a height no greater than the space between said rollers and located toward the outlet end of said rollers, whereby tumbled partial shells still containing said kernels will be impacted and said kernels will be dislodged and fall through said space between said rollers.

2. Apparatus for separating kernels from a partial shell as defined in claim 1, wherein said kernel dislodgment means includes an elongated projecting strip secured to said outer surface of at least one roller and said strip is arcuate.

3. In the final separation of kernels from partial shells of apricot stones wherein said apricot stones have been previously processed to medially fracture each of said shells creating a partial shell with said kernel therein including the steps of:

placing the medially fractured shells containing said kernel on a pair of inclined rollers spaced one from the other and supported for rotation about an axis, said rollers having input ends and outlet ends with said input ends elevated above said output ends;

rotating said rollers in clockwise and counterclockwise directions respectively through power means connected thereto whereby said medially fractured shells containing said kernels will be tumbled along said rollers and at least some of said kernels will be removed and fall between said rollers; and providing a kernel dislodgment means on at least one of said rollers having a height no greater than the space between said rollers and located toward the outlet end whereby said tumbled partial shells still containing said kernels will be impacted and said kernels will be dislodged and fall through said space between said rollers adjacent said outlet ends.

* * * * *

UNITED STATES PATENT AND TRADEMARK OFFICE
CERTIFICATE OF CORRECTION

PATENT NO. : 4,389,927
DATED : June 28, 1983
INVENTOR(S) : Alan W. Crompton

It is certified that error appears in the above-identified patent and that said Letters Patent are hereby corrected as shown below:

On the Title Sheet of the patent correct the line
"[73] Assignee: Alan Woodhouse Crompton,
Marryatville, Australia"

to read - - - [73] assignee: Alf Hannaford & Co.Pty Ltd.,
Beverly, Australia --.

Signed and Sealed this

Twenty-eighth Day of February 1984

[SEAL]

Attest:

GERALD J. MOSSINGHOFF

Attesting Officer

Commissioner of Patents and Trademarks